(12) United States Patent
Sisto

(10) Patent No.: US 7,421,286 B1
(45) Date of Patent: Sep. 2, 2008

(54) TELEPHONE ALERT SYSTEM

(76) Inventor: Silvia G. Sisto, 6402 Mae Anne Ave., Apartment # 19, Reno, NV (US) 89523

( * ) Notice: Subject to any disclaimer, the term of this patent is extended or adjusted under 35 U.S.C. 154(b) by 613 days.

(21) Appl. No.: 11/040,452

(22) Filed: Jan. 24, 2005

(51) Int. Cl.
*H04Q 7/32* (2006.01)
(52) U.S. Cl. .............. 455/557; 455/567; 455/550.1; 455/66.1; 455/344; 379/433.01; 379/433.1; 63/21; 63/25; 156/60; 156/66
(58) Field of Classification Search .............. 455/567, 455/412.2, 66.1, 88, 575.3, 557, 41.1, 41.2, 455/575.1, 550.1, 73, 458, 418–420, 422.1, 455/403, 90.1, 90.2, 90.3, 344, 346, 347; 73/649; 379/433.01, 433.1; 63/21, 25; 156/60, 156/66
See application file for complete search history.

(56) References Cited

U.S. PATENT DOCUMENTS

| 4,225,965 | A | | 9/1980 | Baugh |
|---|---|---|---|---|
| 4,421,953 | A | | 12/1983 | Zielinski |
| 4,833,709 | A | | 5/1989 | Pasinski et al. |
| 5,404,391 | A | | 4/1995 | Wavroch et al. |
| 5,638,421 | A | | 6/1997 | Serrano et al. |
| 5,767,778 | A | | 6/1998 | Stone et al. |
| 5,960,367 | A | * | 9/1999 | Kita ........................... 455/567 |
| 6,263,218 | B1 | * | 7/2001 | Kita ........................... 455/567 |
| 7,085,585 | B2 | * | 8/2006 | Camarillo et al. ........ 455/550.1 |
| 2004/0203503 | A1 | * | 10/2004 | Rollins et al. .............. 455/90.3 |
| 2005/0014534 | A1 | * | 1/2005 | Hareng et al. ............... 455/567 |
| 2005/0266891 | A1 | * | 12/2005 | Mullen ....................... 455/567 |

* cited by examiner

*Primary Examiner*—Keith T Ferguson

(57) ABSTRACT

A telephone alert system for remotely signaling a person when their mobile phone receives a call includes a vibration detection assembly adapted for detecting vibrations and sending a wireless signal when vibrations are detected. The vibration detection assembly is removably attached to the mobile phone. A vibrating assembly is adapted for receiving the wireless signal from the vibration detection assembly and vibrating when the wireless signal is received.

5 Claims, 2 Drawing Sheets

TELEPHONE ALERT SYSTEM

BACKGROUND OF THE INVENTION

1. Field of the Invention

The present invention relates to phone call indicating devices and more particularly pertains to a new phone call indicating device for allowing a person to place a remote unit on a watch or in a pocket which vibrates when their cellular phone vibrates.

2. Description of the Prior Art

The use of phone call indicating devices is known in the prior art. U.S. Pat. No. 4,421,953 describes a device that includes a transmitter electrically coupled to a telephone which emits a radio signal to be received by a detector carried by a person to signal them in a non-audible manner that the telephone is receiving a call. Another type of phone call indicating device is U.S. Pat. No. 4,833,709 which comprises a remote signaling device which again receives a signal from a telephone. The remote signaling device is in the shape of a toy which moves or makes audible signals when the signal is received.

While these devices fulfill their respective, particular objectives and requirements, the need remains for a device that allows a person to receive a remote signal when their mobile phone cannot be hear or felt, such as when it is in vibrate mode. This is particularly useful for times when the mobile phone is in a jacket pocket or in a purse. Additionally, the device should be retrofittable to existing mobile phones and have the ability to detect the vibrations of the mobile phone so that the device need not be electrically coupled directly to the mobile phone.

SUMMARY OF THE INVENTION

The present invention meets the needs presented above by generally comprising a vibration detection assembly adapted for detecting vibrations and sending a wireless signal when vibrations are detected. The vibration detection assembly is removably attached to the mobile phone. A vibrating assembly is adapted for receiving the wireless signal from the vibration detection assembly and vibrating when the wireless signal is received.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
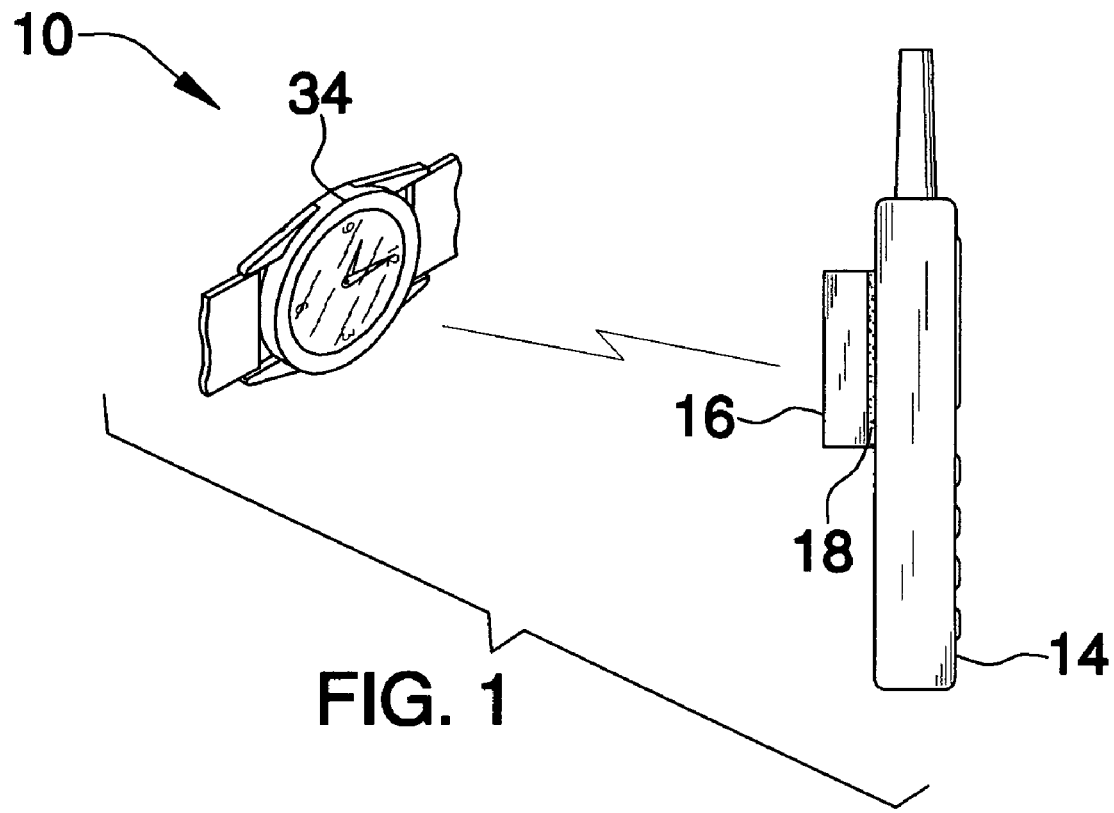
FIG. 1 is a side view of a telephone alert system according to the present invention.
Figure 2:
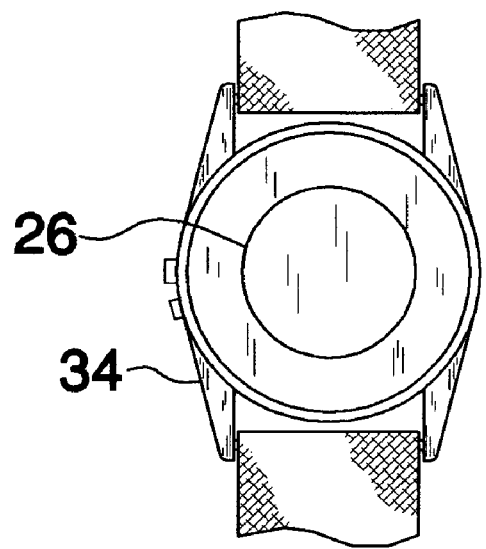
FIG. 2 is a back view of a compartment of the present invention.
Figure 3:
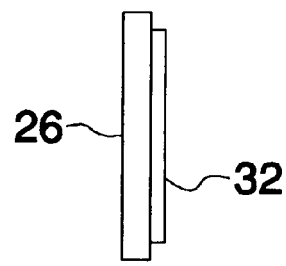
FIG. 3 is a side view of a compartment of the present invention.
Figure 4:
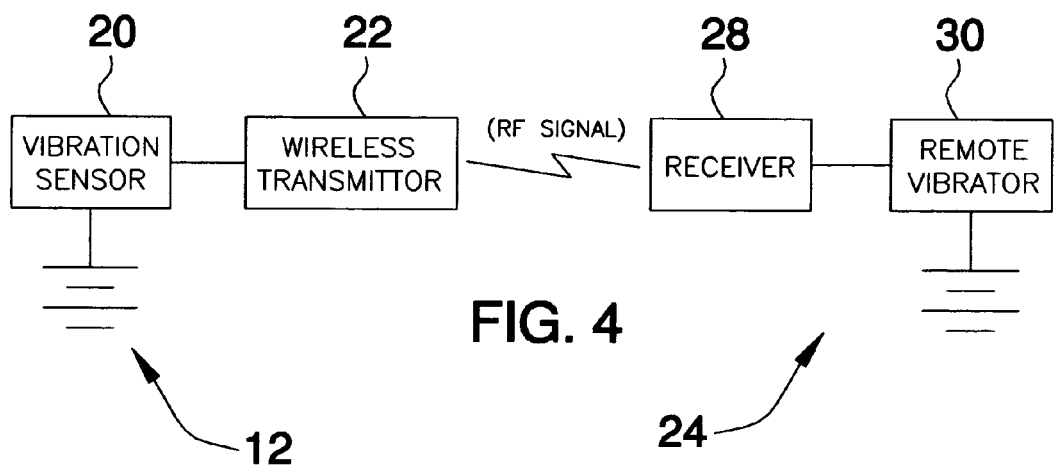
FIG. 4 is a schematic of the present invention.

With reference now to the drawings, and in particular to FIGS. 1 through 4 thereof, a new phone call indicating device embodying the principles and concepts of the present invention and generally designated by the reference numeral 10 will be described.

As best illustrated in FIGS. 1 through 4, the telephone alert system 10 generally comprises a vibration detection assembly 12 adapted for detecting vibrations and sending a wireless signal when a vibration is detected. The vibration detection assembly 12 is removably attached to a mobile phone 14. The vibration detection assembly 12 includes a housing 16 and an adhesive 18 that is positioned on the housing 16. The adhesive 18 removably secures the housing 16 to the mobile phone 14. A vibration sensor 20 is mounted in the housing 16. A transmitter 22 is electrically coupled to the vibration sensor 20. The transmitter 22 sends a wireless signal when the vibration assembly 20 detects vibrations from the mobile phone.

A vibrating assembly 24 is adapted for receiving the wireless signal from the vibration detection assembly 12 and vibrating when the wireless signal is received. The vibrating assembly 24 may be removably attached to a back side of a wristwatch 34. The vibrating assembly 24 includes a compartment 26 that has a width less than ½ inch. The compartment 26 is disc shaped for the comfort of a user carrying the compartment 26. A receiver 28 is mounted in the compartment 26 and is adapted for receiving the wireless signal. An oscillating member 30 is electrically coupled to the receiver 28. The oscillating member 30 is turned on when the receiver 28 receives the wireless signal so that the compartment 26 vibrates. An adhesive 32 is positioned on the compartment 26 so that it may be removably secured to the wristwatch 34.

In use, the system 10 allows a person to place their mobile phone 14 on vibrate mode and then place the mobile phone 14 in a place not on their body, such as in a purse. The compartment 26 may then be placed on the back of a watch, or in a pocket, to signal the person should they not feel or hear the mobile phone 14. When the mobile phone 14 vibrates, a signal is sent from the transmitter 22 to the receiver so that the oscillating member 30 vibrates the compartment 26 to signal the person that they need to answer their mobile phone 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mobile phone alerting system for providing a remote warning when the mobile phone vibrates, said system comprising:

a vibration detection assembly adapted for detecting vibrations and sending a wireless signal when vibrations are detected, said vibration detection assembly being removably attached to the mobile phone; and a vibrating assembly adapted for receiving the wireless signal from said vibration detection assembly and vibrating when the wireless signal is received, said vibrating assembly further includes an adhesive for selectively attaching said vibrating assembly to a backside of a wristwatch.

2. The alerting system according to claim 1, wherein said vibration detection assembly includes:

a housing;

an adhesive being positioned on said housing, said adhesive removably securing said housing to the mobile phone;

a vibration sensor being mounted in said housing;

a transmitter being electrically coupled to said vibration sensor, said transmitter sending a wireless signal when said vibration assembly detects vibrations from the mobile phone.

3. The alerting system according to claim 2, wherein said vibrating assembly includes:

a compartment, said compartment having a width less than ½ inch, said compartment being disc shaped;

a receiver being mounted in said compartment and being adapted for receiving the wireless signal;

an oscillating member being electrically coupled to said receiver, said oscillating member being turned on when said receiver receives the wireless signal such that said compartment vibrates.

4. The alerting system according to claim 1, wherein said vibrating assembly includes:

a compartment, said compartment having a width less than ½ inch, said compartment being disc shaped;

a receiver being mounted in said compartment and being adapted for receiving the wireless signal;

an oscillating member being electrically coupled to said receiver, said oscillating member being turned on when said receiver receives the wireless signal such that said compartment vibrates.

5. A mobile phone alerting system for providing a remote warning when the mobile phone vibrates, said system comprising:

a vibration detection assembly adapted for detecting vibrations and sending a wireless signal when vibrations are detected, said vibration detection assembly being removably attached to the mobile phone, said vibration detection assembly including;

a housing;

an adhesive being positioned on said housing, said adhesive removably securing said housing to the mobile phone;

a vibration sensor being mounted in said housing;

a transmitter being electrically coupled to said vibration sensor, said transmitter sending a wireless signal when said vibration assembly detects vibrations from the mobile phone;

a wristwatch having a back side;

a vibrating assembly adapted for receiving the wireless signal from said vibration detection assembly and vibrating when the wireless signal is received, said vibrating assembly being removably attached to said back side of said wristwatch, said vibrating assembly including;

a compartment, said compartment having a width less than ½ inch, said compartment being disc shaped, said compartment being centrally located on said back side and being spaced from a perimeter edge of said back side;

a receiver being mounted in said compartment and being adapted for receiving the wireless signal;

an oscillating member being electrically coupled to said receiver, said oscillating member being turned on when said receiver receives the wireless signal such that said compartment vibrates; and an adhesive being positioned on said compartment and removably securing said compartment to the wristwatch.

\* \* \* \* \*